(12) United States Patent
Zhang

(10) Patent No.: US 12,607,053 B2
(45) Date of Patent: Apr. 21, 2026

(54) REAR STRUCTURE FOR VEHICLE BODY AND OPPOSING HINGED DOOR VEHICLE

(71) Applicant: XIAOMI EV TECHNOLOGY CO., LTD., Beijing (CN)

(72) Inventor: Dawei Zhang, Beijing (CN)

(73) Assignee: XIAOMI EV TECHNOLOGY CO., LTD., Beijing (CN)

( * ) Notice: Subject to any disclaimer, the term of this patent is extended or adjusted under 35 U.S.C. 154(b) by 339 days.

(21) Appl. No.: 18/242,348

(22) Filed: Sep. 5, 2023

(65) Prior Publication Data

US 2024/0391305 A1 Nov. 28, 2024

(30) Foreign Application Priority Data

May 26, 2023 (CN) .......................... 202310613135.4

(51) Int. Cl.
 *E05D 5/06* (2006.01)
 *B60J 5/04* (2006.01)
 *E05D 5/12* (2006.01)

(52) U.S. Cl.
 CPC ............ *E05D 5/062* (2013.01); *B60J 5/0477* (2013.01); *E05D 5/128* (2013.01)

(58) Field of Classification Search
 CPC . B60J 5/105; B60J 5/107; B60J 5/0477; B60J 5/0479; E05D 7/121; E05D 5/062
 See application file for complete search history.

(56) References Cited

U.S. PATENT DOCUMENTS

| | | | | |
|---|---|---|---|---|
| 6,305,737 B1 * | 10/2001 | Corder | .................... | E05F 15/63 |
| | | | | 296/146.12 |
| 6,382,705 B1 * | 5/2002 | Lang | ......................... | B60J 5/06 |
| | | | | 49/248 |
| 6,609,748 B1 | 8/2003 | Azzouz et al. | | |
| 6,629,337 B2 * | 10/2003 | Nania | ..................... | E05D 3/127 |
| | | | | 16/334 |
| 6,842,945 B2 * | 1/2005 | Hiramatsu | .............. | E05D 3/127 |
| | | | | 16/371 |
| 9,303,437 B1 * | 4/2016 | Holmes | ................. | E05F 1/1207 |

(Continued)

FOREIGN PATENT DOCUMENTS

| | | |
|---|---|---|
| CN | 204850842 U | 12/2015 |
| CN | 113846924 A | 12/2021 |

(Continued)

OTHER PUBLICATIONS

Excerpts from "300c suicide door conversions" discussion, 300cforums. com, original post dated Dec. 27, 2005, https://www.300cforums. com/threads/300c-suicide-doors-conversions.13793/. Accessed Oct. 9, 2025. (Year: 2005).*

(Continued)

*Primary Examiner* — Robert E Fuller
(74) *Attorney, Agent, or Firm* — Cozen O'Connor

(57) ABSTRACT
A rear structure for a vehicle body includes a hinge mechanism, a rear door and a wheel cover inner reinforcing plate at a rear floor. The hinge mechanism includes a hinge seat and a rotating arm. The hinge seat is coupled to the wheel cover inner reinforcing plate, the rotating arm is rotatably coupled to the hinge seat, and the rotating arm is coupled to the rear door. An opposing hinged door vehicle is also provided.

15 Claims, 6 Drawing Sheets

(56)         References Cited

U.S. PATENT DOCUMENTS

| | | | | |
|---|---|---|---|---|
| 2004/0155524 A1* | 8/2004 | Acker | ................... | B60R 11/00 |
| | | | | 903/905 |
| 2005/0194820 A1* | 9/2005 | Azzouz | ................ | B60J 5/0479 |
| | | | | 296/193.05 |
| 2010/0156140 A1* | 6/2010 | Elliott | ................... | B62D 25/04 |
| | | | | 16/412 |
| 2016/0362926 A1* | 12/2016 | Dey | .......................... | E05F 5/06 |
| 2023/0202269 A1* | 6/2023 | Yun | ........................ | B60J 5/0463 |
| | | | | 296/146.9 |
| 2024/0200375 A1* | 6/2024 | Ginnard | ................... | E05C 1/04 |

FOREIGN PATENT DOCUMENTS

| | | | | | |
|---|---|---|---|---|---|
| DE | 10155220 | C1 * | 2/2003 | ........... | B60J 5/0479 |
| DE | 10226881 | A1 | 7/2003 | | |
| DE | 10146835 | B4 | 12/2005 | | |
| DE | 102011110904 | A1 * | 3/2012 | ........... | E05D 3/127 |
| DE | 102014003396 | A1 * | 10/2014 | .............. | B60J 5/06 |
| JP | 2007223518 | A | 9/2007 | | |
| WO | WO-2004028884 | A2 * | 4/2004 | ............. | B60J 5/047 |

OTHER PUBLICATIONS

Excerpt from "2007 Spyker D12 Peking-to-Paris Gallery", supercars. net, page dated 2021, https://www.supercars.net/blog/2007-spyker-d12-peking-paris-gallery/. Accessed Oct. 9, 2025 (Year: 2021).*
European Patent Application No. 23198698.5 Search Report dated Mar. 27, 2024, 7 pages.
Chinese Patent Application No. 202310613135.4, Office Action with English translation dated Jul. 24, 2025, 16 pages.

* cited by examiner

REAR STRUCTURE FOR VEHICLE BODY AND OPPOSING HINGED DOOR VEHICLE

CROSS-REFERENCE TO RELATED APPLICATIONS

The present application claims the benefit of priority to Chinese Application No. 202310613135.4, filed on May 26, 2023, the contents of which are incorporated herein by reference in their entireties for all purposes.

BACKGROUND

Automotive vehicles have roof support structures that are labeled as A-pillar on either side of a windshield, B-pillar between the front and rear doors and C-pillar on either side of the rear window of a sedan or the vertical structure behind the rear door on an SUV or minivan. Opposing hinged doors, or doors mounted to the A pillar and the C-pillar, are a novel door opening method for vehicles. In the related art, a rear door of the opposing hinged door vehicles is often installed on a C-pillar through at least two hinges.

SUMMARY

The present disclosure relates to the field of vehicles, and in particular to a rear structure for a vehicle body and an opposing hinged door vehicle.

According to a first aspect of embodiments of the present disclosure, there is provided a rear structure for a vehicle body. The rear structure includes a hinge mechanism, a rear door and a wheel cover inner reinforcing plate at the rear floor. The hinge mechanism includes a hinge seat and a rotating arm. The hinge seat is coupled to the wheel cover inner reinforcing plate, the rotating arm is rotatably coupled to the hinge seat, and the rotating arm is coupled to the rear door.

According to the second aspect of embodiments of the present disclosure, there is also provided an opposing hinged door vehicle, which includes a rear structure for a vehicle body. The rear structure includes a hinge mechanism, a rear door and a wheel cover inner reinforcing plate at the rear floor. The hinge mechanism includes a hinge seat and a rotating arm. The hinge seat is coupled to the wheel cover inner reinforcing plate, the rotating arm is rotatably coupled to the hinge seat, and the rotating arm is coupled to the rear door.

BRIEF DESCRIPTION OF THE DRAWINGS

The accompanying drawings, which are incorporated in and constitute a part of this specification, illustrate embodiments consistent with the disclosure and together with the description, serve to explain the principles of the disclosure.

Figure 1:
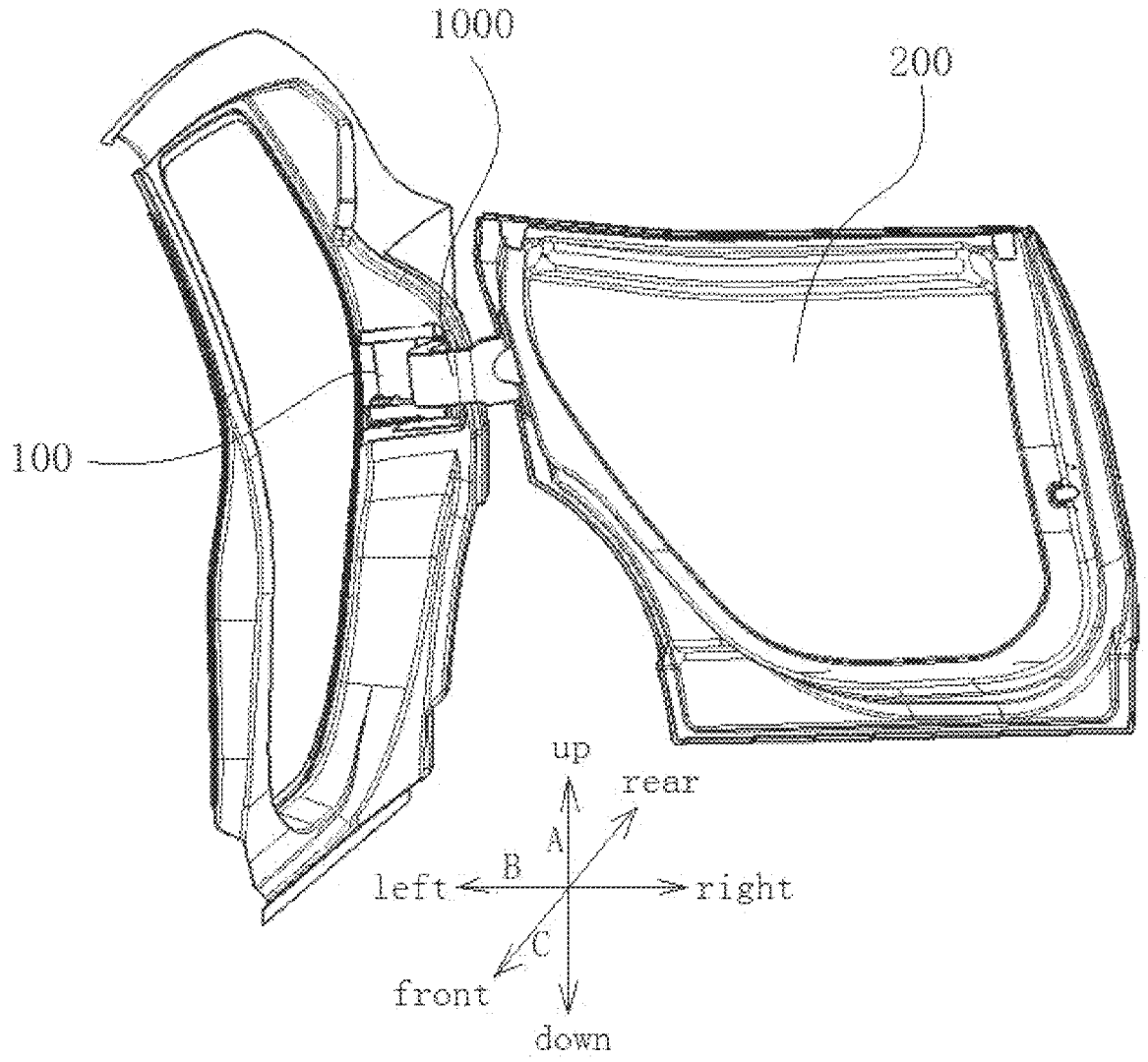
FIG. 1 is a structural schematic diagram of a rear structure for a vehicle body according to an embodiment, with a rear door in an open state.

| Reference numerals: | | | |
|---|---|---|---|
| 1 | hinge seat | 11 | first support arm |
| 111 | first bottom seat | 112 | first support arm plate |
| 113 | first top seat | 12 | second support arm |
| 121 | second bottom seat | 122 | second support arm plate |
| 123 | second top seat | 13 | coupling beam |
| 14 | stopper | 110 | first reinforcing mechanism |
| 120 | weight-reducing groove | 2 | rotating shaft |
| 3 | rotating arm | 31 | sleeve |
| 32 | rotating arm body | 33 | first fastener |
| 321 | mounting plate | 322 | bending arm |
| 3221 | first bending section | 3222 | second bending section |
| 3223 | first bending sub-arm | 3224 | second bending sub-arm |
| 3225 | second fastener | 3226 | first body |
| 3227 | first coupling part | 3228 | second body |
| 3229 | second coupling part | 70 | first fastening hole |
| 90 | second fastening hole | 71 | first step surface |
| 72 | second step surface | 91 | third step surface |
| 92 | fourth step surface | 100 | wheel cover inner reinforcing plate at the rear floor |
| 200 | rear door | A | first Direction |
| B | second direction | C | third direction |

DETAILED DESCRIPTION

Reference will now be made in detail to embodiments, examples of which are illustrated in the accompanying drawings. When the following description refers to the drawings, unless otherwise indicated, the same numbers in different drawings indicate the same or similar elements. The implementations described in the following embodiments do not represent all implementations consistent with the present disclosure. Rather, they are merely examples of devices and methods consistent with some aspects of the present disclosure as detailed in the appended claims.

Figure 2:
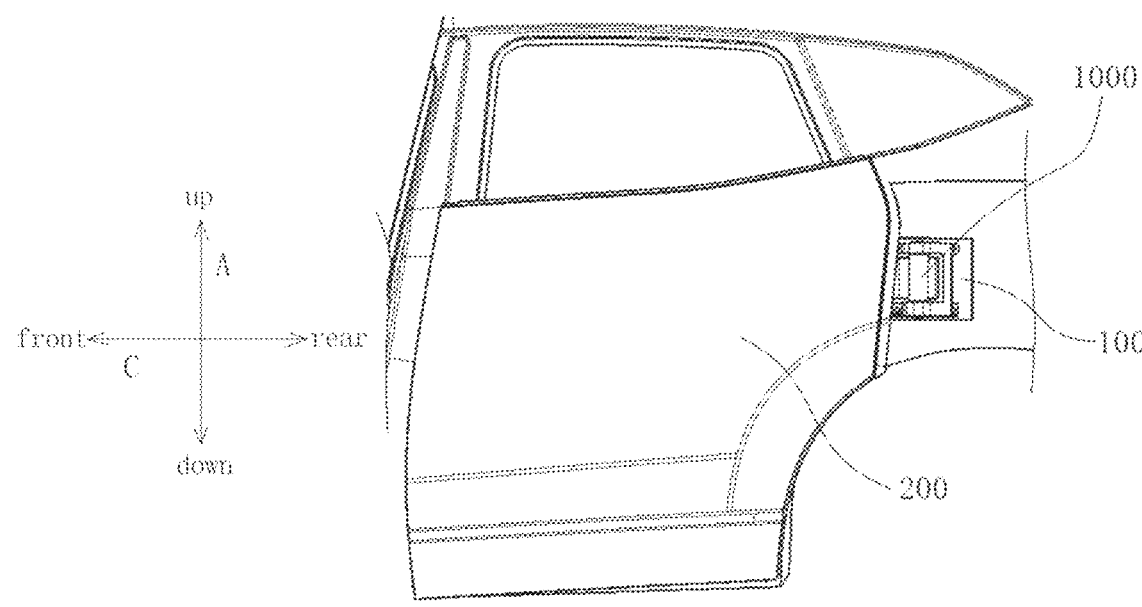
FIG. 2 is a structural schematic diagram of a rear structure of a vehicle body according to an embodiment, with a rear door in a closed state.

In the present disclosure, unless otherwise stated, directional words such as "up, down, left, right, front and rear" used can refer to the ones illustrated in FIGS. 1 and 2. Directional words such as "first direction, second direction and third direction" used can refer to the ones illustrated in FIG. 3. Terms such as "first" and "second" are used only to distinguish an element from another, and are not sequential or important.

For the C-pillar of a vehicle, on the one hand, there needs to be enough arrangement space in an up-and-down direction, on the other hand, there needs to be enough mounting surface size in a left-and-right direction, which leads to a large design size of the C-pillar, and in turn leads to a large rear door seam of the C-pillar. Thus a size of the rear door opening is reduced, which affects convenience of passengers getting into and out of the vehicle. In addition, after the hinges are installed on the C-pillar, in order to avoid the interference between the rear door and the side wall in the process of opening the door, the rear side wall needs to be divided into parts, which increases costs and mold investment of the single side wall.

As illustrated in FIGS. 1 to 10, the present disclosure provides a rear structure of a vehicle body, which includes a hinge mechanism 1000, a rear door 200, and a wheel cover inner reinforcing plate 100 at the rear floor. The hinge mechanism 1000 includes a hinge seat 1 and a rotating arm 3. The hinge seat 1 is coupled to the wheel cover inner reinforcing plate 100. The rotating arm 3 is rotatably coupled to the hinge seat 1, and the rotating arm 3 is coupled to the rear door 200.

In the above technical solution, firstly, the hinge seat 1 is coupled to the wheel cover inner reinforcing plate 100, there is no need to reserve an arrangement space on a C-pillar, and a size of the C-pillar will not be increased at the same time, so that the molding dividing seam will not be limited. Secondly, by arranging the hinge seat 1 on the wheel cover inner reinforcing plate 100, the requirements of the mounting strength and rigidity of the rear door 200 can be effectively met. In addition, by arranging the hinge seat 1 on the wheel cover inner reinforcing plate 100, the size of the rear door opening in the front-and-rear direction will not be affected, and there is no need to increase the wheelbase of the vehicle to meet the requirements of getting on and off.

Figure 3:
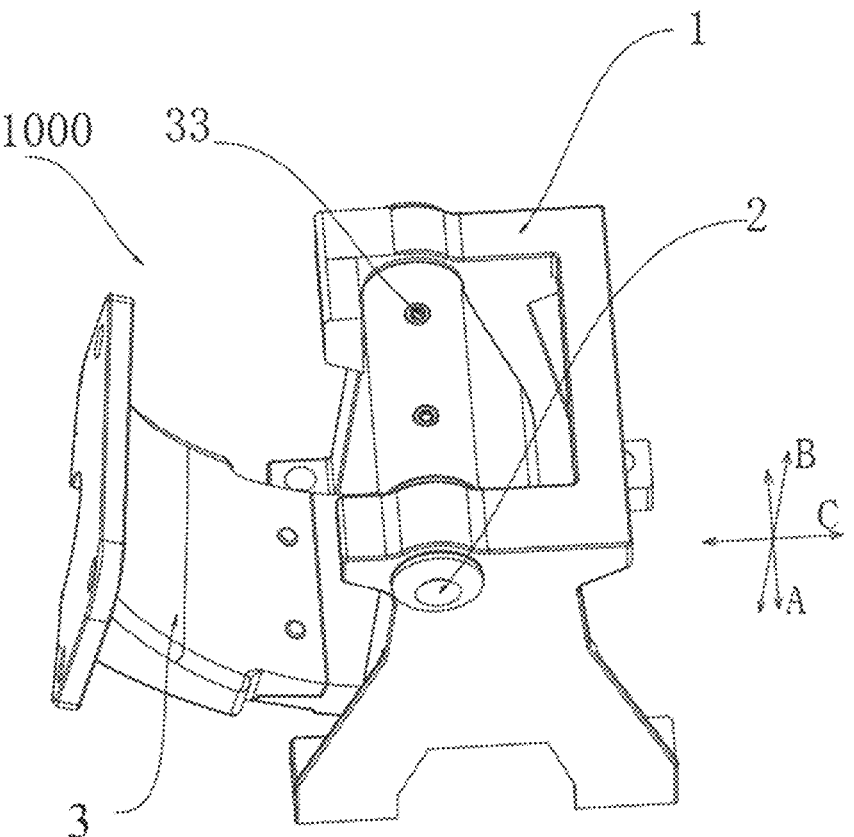
FIG. 3 is a schematic structural view of a hinge mechanism of a rear structure of a vehicle body according to an embodiment.

In some examples, as illustrated in FIGS. 1, 2 and 3, the hinge mechanism 1000 further includes a rotating shaft 2. A single hinge seat 1, a single rotating shaft 2 and a single rotating arm 3 are provided. The rotating arm 3 is rotatably coupled to the hinge seat 1 through the rotating shaft 2, and the rotating shaft 2 is located at a rear side of the rear door 200.

In this embodiment, since the single hinge seat 1, the single rotating shaft 2 and the single rotating arm 3 are provided, the opposing hinged door opening function is realized by adopting a single hinge, and there is no need to provide a plurality of hinges, which is beneficial to simplifying the structure and reducing the use of arrangement space. In addition, the rotating shaft 2 is arranged at the rear side of the rear door 200, thus realizing the outswing door opening, without occupying an inner space of the side wall, and the outer panel of the side wall can be integrally stamped without being divided.

In an embodiment, as illustrated in FIG. 3, the hinge mechanism 1000 further includes a rotating shaft 2. The rotating shaft 2 is rotatably coupled to the hinge seat 1 around an axis extending in a first direction A. The rotating arm 3 includes a sleeve 31, a rotating arm body 32 and a first fastener 33. The rotating arm body 32 is coupled to the sleeve 31, the sleeve 31 is sleeved on the rotating shaft 2 and fixedly coupled to the rotating shaft 2 through the first fastener 33, and the rotating arm body 32 is coupled to the rear door 200.

In this embodiment, the sleeve 31 is sleeved on the rotating shaft 2 and fixedly coupled to the rotating shaft 2 through the first fastener 33, so that the stability of the coupling between the rotating arm 3 and the rotating shaft 2 can be improved. For example, the sleeve 31 is provided with a first mounting hole 310, the rotating shaft 2 is provided with a second mounting hole 20, and the first fastener 33 is configured as a pin, which penetrates through the first mounting hole 310 and the second mounting hole 20 to realize the fixed coupling between the sleeve 31 and the rotating shaft 2. However, the present disclosure does not limit the coupling means between the rotating arm 3 and the rotating shaft 2. In addition, the present disclosure does not limit the specific structure of the rotating arm body 32, and the rotating arm body 32 can be constructed in any suitable shape and structure.

In some examples, as illustrated in FIGS. 1, 3, 4 and 7, the rotating arm body 32 includes a mounting plate 321 and a bending arm 322 coupled to each other. The bending arm 322 has a first end coupled to the sleeve 31 and a second end coupled to the mounting plate 321. The bending arm 322 bends around the rotating shaft 2 and protrudes toward the wheel cover inner reinforcing plate 100, and the mounting plate 321 is coupled to the rear door 200.

In this embodiment, the arrangement of the mounting plate 321 can facilitate the coupling with the rear door 200, increase the area between the rotating arm 3 and the rear door 200 while improving the convenience of coupling, and improve the stability of mounting. For example, the mounting plate 321 may be provided with a plurality of third mounting holes 3210, and the plurality of third mounting holes 3210 and the rear door 200 are penetrated by bolts corresponding to the plurality of third mounting holes 3210 in one-to-one correspondence, to realize the coupling between the mounting plate 321 and the rear door 200. In addition, the bending arm 322 bends around the rotating shaft 2 and protrudes toward the wheel cover inner reinforcing plate 100, which improves the structural strength and facilitates the rotation of the rear door 200.

In some examples, as illustrated in FIGS. 3 to 6, the bending arm 322 includes a first bending sub-arm 3223 and a second bending sub-arm 3224 detachably coupled to each other, the first bending sub-arm 3223 is coupled to the sleeve 31, and the second bending sub-arm 3224 is coupled to the rear door 200.

In this embodiment, the first bending sub-arm 3223 is coupled to the sleeve 31, the second bending sub-arm 3224 is coupled to the rear door 200, and the first bending sub-arm 3223 and the second bending sub-arm 3224 are detachably coupled to each other. In the process of assembly, the first bending sub-arm 3223 and the sleeve 31 can be coupled to the hinge seat 1, and then assembled to the wheel cover inner reinforcing plate 100 as a whole. For the second bending sub-arm 3224, it can be installed to the rear door 200, and then assembled with the first bending sub-arm 3223, which is convenient for assembly and disassembly.

Figure 4:
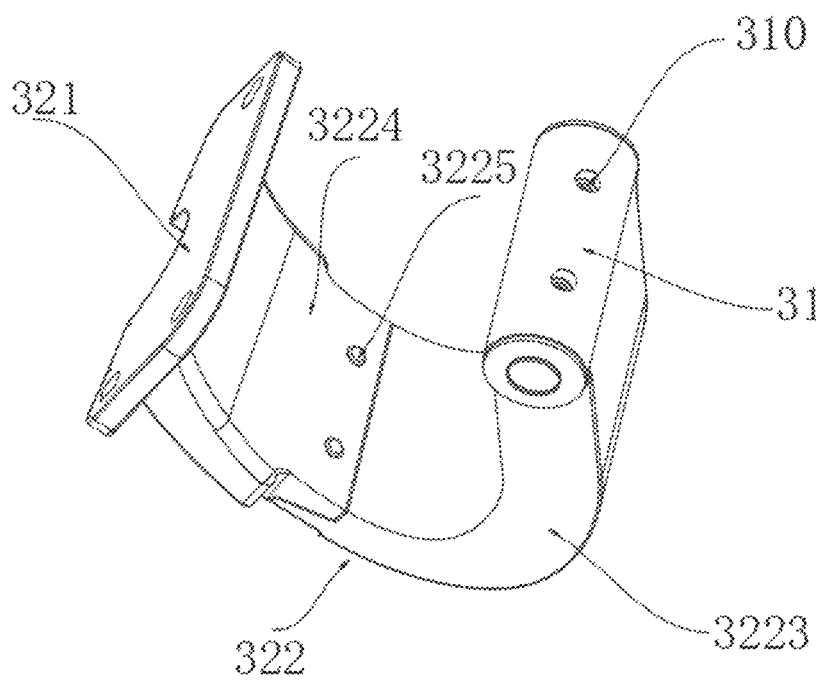
FIG. 4 is a structural schematic diagram of a rotating arm of a hinge mechanism of a rear structure of a vehicle body according to an embodiment.
Figure 5:
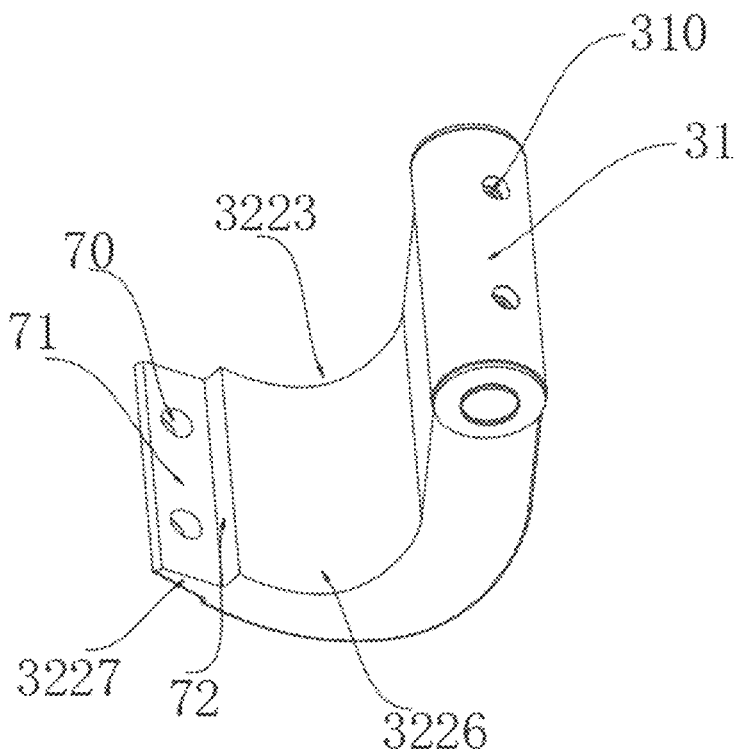
FIG. 5 is a structural schematic diagram of a first bending sub-arm and a sleeve of a hinge mechanism of a rear structure of a vehicle body according to an embodiment.
Figure 6:
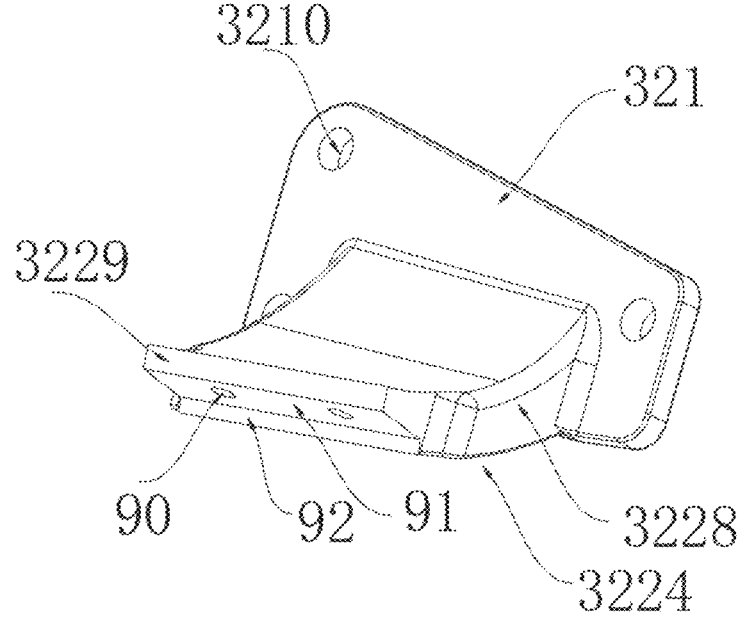
FIG. 6 is a structural schematic diagram of a second bending sub-arm and a mounting plate of a hinge mechanism of a rear structure of a vehicle body according to an embodiment.
Figure 7:
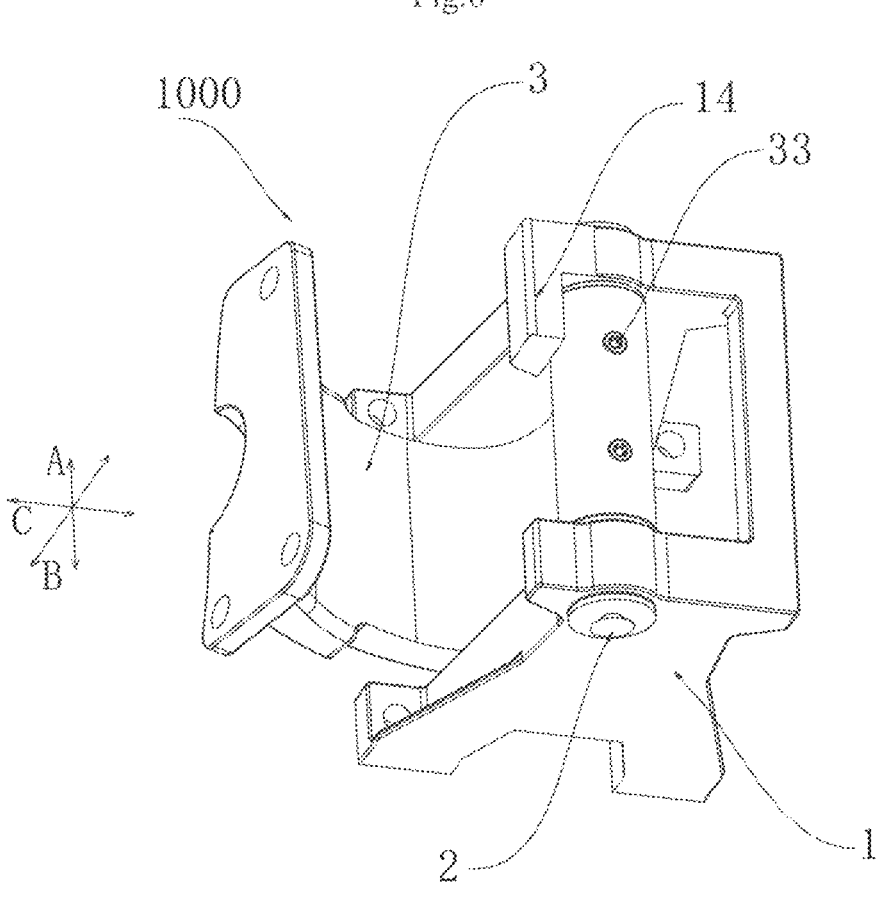
FIG. 7 is a schematic structural view of a hinge mechanism of a rear structure of a vehicle body according to another embodiment.
Figure 8:
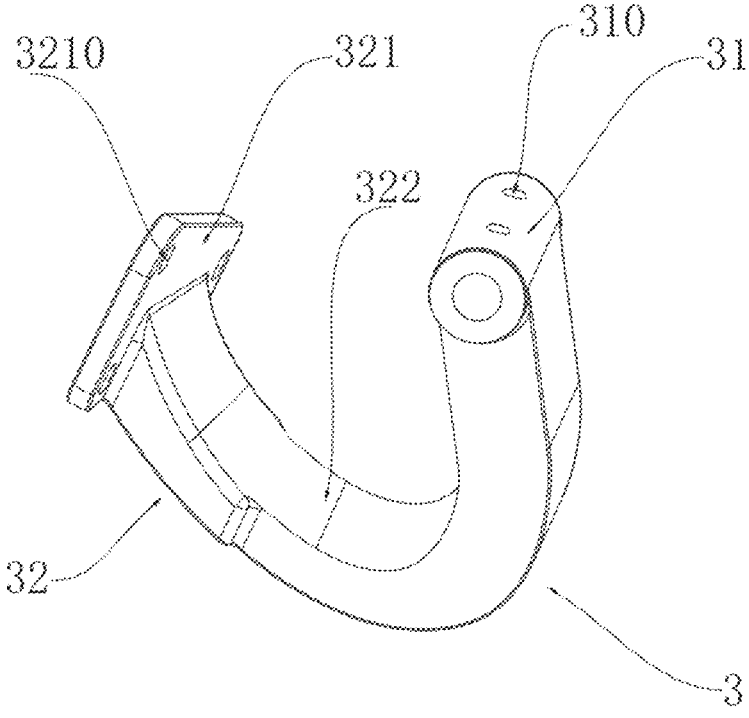
FIGS. 8 and 9 are schematic structural views of a rotating arm of a hinge mechanism of a rear structure of a vehicle body according to another embodiment.
Figure 9:
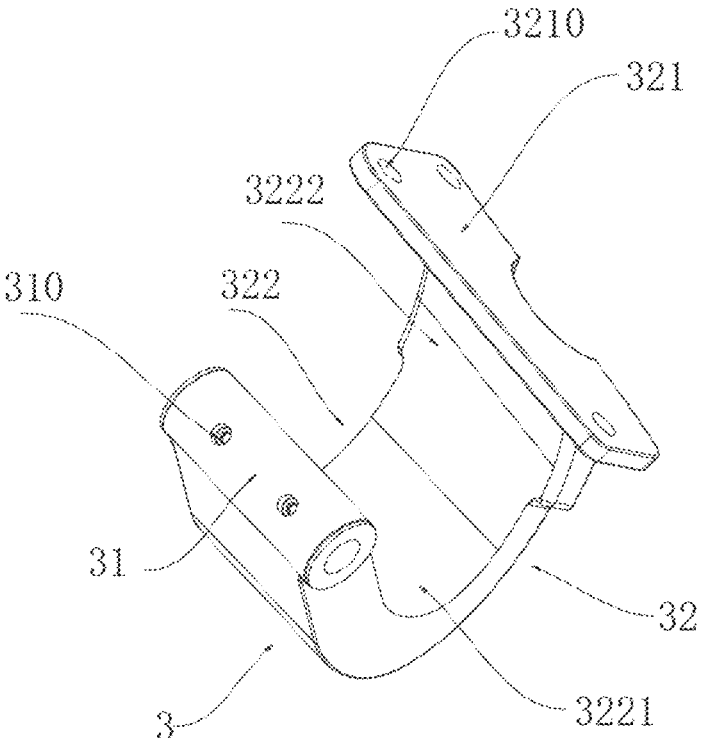

As illustrated in FIGS. 4 to 6, the bending arm 322 further includes a second fastener 3225. The first bending sub-arm 3223 includes a first body 3226 and a first coupling part 3227 coupled to each other. The first body 3226 is coupled to the sleeve 31, and the first coupling part 3227 is provided with a first fastening hole 70. The second bending sub-arm 3224 includes a second body 3228 and a second coupling part 3229 coupled to each other. The second body 3228 is coupled to the mounting plate 321, and the second coupling part 3229 is provided with a second fastening hole 90. The second fastener 3225 penetrates the first fastening hole 70 and the second fastening hole 90 to couple the first coupling part 3227 to the second coupling part 3229. That is, in this embodiment, the detachable coupling between the first bending sub-arm 3223 and the second bending sub-arm 3224 is realized by fastener coupling, which is simple and firm, and is convenient for disassembly and mounting. However, the present disclosure does not limit the specific coupling means of the first bending sub-arm 3223 and the second bending sub-arm 3224.

In some examples, as illustrated in FIGS. 5 and 6, the first coupling part 3227 is provided with a first step surface 71 and a second step surface 72 arranged in an intersecting manner, and the second coupling part 3229 is provided with a third step surface 91 and a fourth step surface 92 arranged in an intersecting manner, and the first step surface 71 can abut on the third step surface 91, and the second step surface 72 can abut on the fourth step surface 92.

By making the first step surface 71 abut on the third step surface 91 and making the second step surface 72 abut on the fourth step surface 92, tightness of the abutment between the first bending sub-arm 3223 and the second bending sub-arm 3224 can be effectively improved, thereby improving the stability of the coupling between the first bending sub-arm 3223 and the second bending sub-arm 3224.

In some examples, as illustrated in FIG. 4, a size of the second bending sub-arm 3224 in the first direction A is larger than a size of the first bending sub-arm 3223 in the first direction A, so that the strength of the end of the bending arm 322 is improved and the bending arm 322 is prevented from being broken due to insufficient strength. In addition, a size of the mounting plate 321 in the first direction A can be larger than the size of the second bending sub-arm 3224 in the first direction A, which is also convenient for mounting with the rear door 200 and improves the stability of mounting.

In other embodiments, as illustrated in FIGS. 7 to 10, the bending arm 322 is constructed as an integrally formed structure and includes a first bending section 3221 and a second bending section 3222 coupled to each other. A side of the first bending section 3221 far away from the second bending section 3222 is coupled to the sleeve 31, and a side of the second bending section 3222 far away from the first bending section 3221 is coupled to the mounting plate 321. A size of the second bending section 3222 in the first direction A is larger than a size of the first bending section 3221 in the first direction A, and the size of the mounting plate 321 in the first direction A is larger than the size of the second bending section 3222 in the first direction A.

In this embodiment, the bending arm 322 is constructed as an integrally formed structure, which is convenient for processing and forming. The size of the second bending section 3222 in the first direction A is larger than the size of the first bending section 3221 in the first direction A, which can effectively improve the strength of the end of the bending arm 322 and the bending arm 322 is prevented from being broken due to insufficient strength. In addition, the size of the mounting plate 321 in the first direction A is larger than the size of the second bending section 3222 in the first direction A, which is also convenient for mounting with the rear door 200, and improves the stability of mounting.

Figure 10:
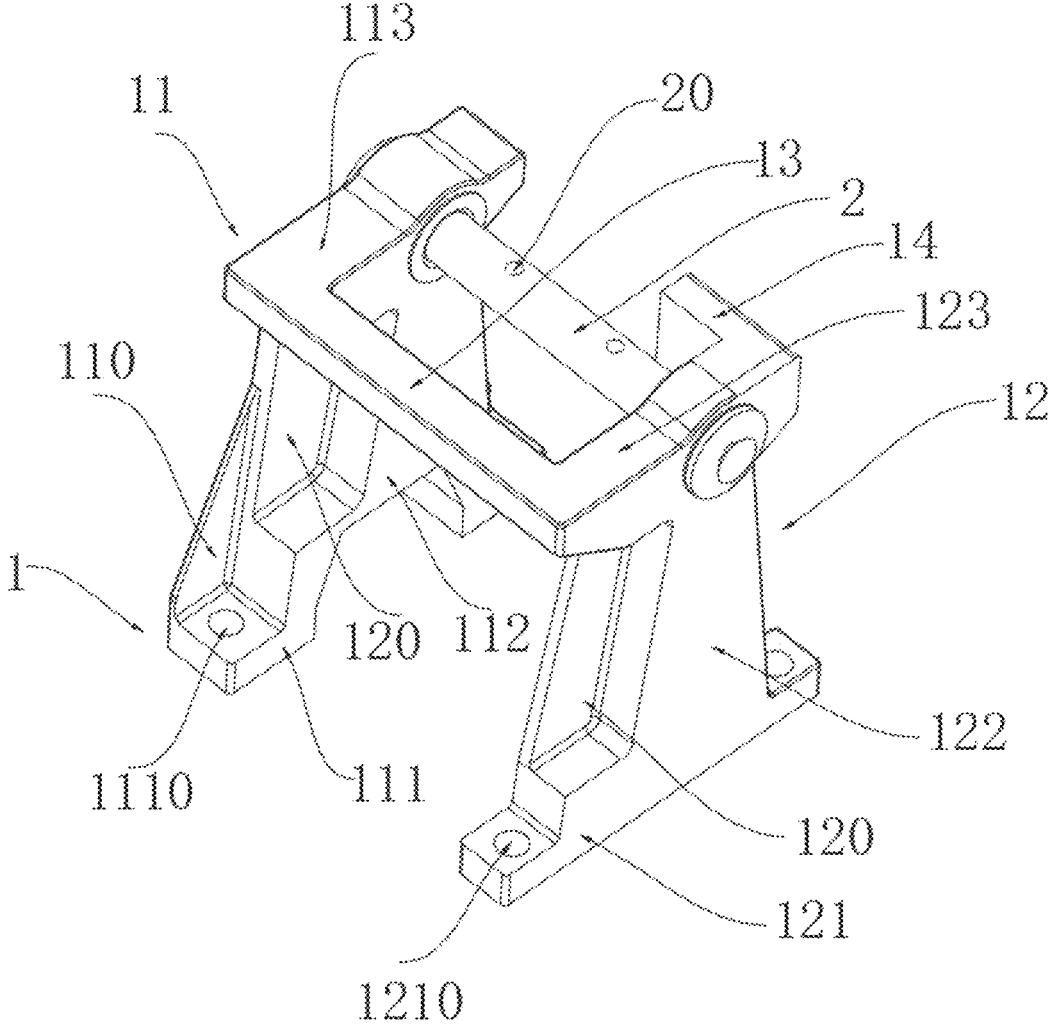
FIG. 10 is a schematic structural view of a hinge seat and a rotating shaft of a rear structure of a vehicle body according to an embodiment.

As illustrated in FIG. 10, the hinge mechanism 1000 further includes a rotating shaft 2, and the hinge seat 1 includes a first support arm 11, a second support arm 12 and a coupling beam 13. The first support arm 11 and the second support arm 12 are oppositely arranged at intervals along the first direction A and coupled through the coupling beam 13, and the first support arm 11 and the second support arm 12 are coupled to the wheel cover inner reinforcing plate 100, and the rotating shaft 2 is rotatably coupled to the first support arm 11 and the first support arm 12 around an axis extending in the first direction A. The rotating arm 3 is coupled to the rotating shaft 2, and the hinge seat 1 is simple in structure and stable in mounting. However, the present disclosure does not limit the specific structure of the hinge seat 1.

In another embodiment, as illustrated in FIG. 10, the first support arm 11 includes a first bottom seat 111, a first support arm plate 112 and a first top seat 113. The first support arm plate 112 extends along the second direction B, the first bottom seat 111 is coupled to a first side of the first support arm plate 112 along the second direction B, and the first top seat 113 is coupled to the a second side of the first support arm plate 112 along the second direction B. The second support arm 12 includes a second bottom seat 121, a second support arm plate 122 and a second top seat 123. The second support arm plate 122 extends along the second direction B, and the second bottom seat 121 is coupled to a first side of the second support arm plate 122 along the second direction B, and the second top seat 123 is coupled to a second side of the second support arm plate 122 along the second direction B. The first bottom seat 111 and the second bottom seat 121 are used to couple the wheel cover inner reinforcing plate 100, the coupling beam 13 couples the first top seat 113 to the second top seat 123, and the rotating shaft 2 is rotatably coupled between the first top seat 113 and the second top seat 123. The second direction B intersects with the first direction A.

The first bottom seat 111 and the second bottom seat 121 are used to couple the wheel cover inner reinforcing plate 100, which can effectively improve the stability of the hinge seat 1 coupled to the wheel cover inner reinforcing plate 100. For example, the first bottom seat 111 is provided with two first bottom seat holes 1110 arranged at intervals along the third direction C, and the second bottom seat 121 is provided with two second bottom seat holes 1210 arranged at intervals along the third direction C. Two first bottom seat holes 1110 and two second bottom seat holes 1210 are penetrated by bolts, and the first bottom seat 111 and the second bottom seat 121 are coupled to the wheel cover inner reinforcing plate 100. That is, the hinge seat 1 is mounted on the wheel cover inner reinforcing plate 100 through four mounting points, and the mounting stability is stronger.

Secondly, both the first support arm plate 112 and the second support arm plate 122 extend along the second direction B, to facilitate the arrangement of the rotating arm 3 in the second direction B. In addition, the coupling beam 13 couples the first top seat 113 to the second top seat 123, and the rotating shaft 2 is rotatably coupled between the first top seat 113 and the second top seat 123. The coupling beam 13 can improve the stability of the coupling between the first top seat 113 and the second top seat 123, and the stability of the coupling between the first support arm 11 and the second support arm 12. The arrangement of the first top seat 113 and the second top seat 123 also facilitates the mounting and arrangement of the rotating shaft 2.

In some examples, the rotating arm 3 is arranged between the first support arm 11 and the second support arm 12, and the projection of the rotating arm 3 in the first direction A is partially within the projection of the first support arm 11 and the second support arm 12 in the first direction A. That is, the rotating arm 3 is partially arranged between the first support arm 11 and the second support arm 12, so that the space between the first support arm 11 and the second support arm 12 is effectively utilized, the utilization rate of the space is improved, and the compact design of the hinge mechanism 1000 is facilitated.

As illustrated in FIG. 10, the hinge seat 1 further includes a stopper 14, the stopper 14 is arranged on the first top seat 113 and/or the second top seat 123 and can abut against the rotating arm 3 to limit the rotating angle of the rotating arm 3, avoid the rotating arm 3 from rotating excessively, and meet the use requirements. The stopper 14 can be constructed in any suitable shape and structure, which is not limited by the present disclosure. For example, the stopper 14 can be constructed as a limit block structure.

In another embodiment, as illustrated in FIG. 10, the first support arm plate 112 and/or the second support arm plate 122 are provided with a weight-reducing groove 120, and/or, a first reinforcing structure 110 is coupled between the first support arm plate 112 and the first bottom seat 111, and/or, a second reinforcing structure is coupled between the second support arm plate 122 and the second bottom seat 121. The arrangement of the weight-reducing groove 120 can effectively reduce the weight of the hinge mechanism 1000, which is convenient for lightweight design, and the design of the reinforcement structure can effectively improve the overall structural strength of the hinge mechanism 1000.

In other embodiments, as illustrated in FIG. 10, a size of the first support arm plate 112 in the third direction C gradually decreases in a direction away from the first bottom seat 111 along the second direction B, the first direction A, the second direction B and the third direction C being perpendicular to each other; and/or, a size of the second support arm plate 122 in the third direction C gradually decreases in a direction away from the second bottom seat 121 along the second direction B, the first direction A, the second direction B and the third direction C being perpendicular to each other. The shape of the first support arm plate 112 and the second support arm plate 122 can improve the stability of their own structure and effectively reduce their own weight, which is convenient for lightweight design.

The present disclosure also provides an opposing hinged door vehicle. The opposing hinged door vehicle includes a rear structure for a vehicle body according to embodiments described above.

According to a first aspect of embodiments of the present disclosure, there is provided a rear structure for a vehicle body. The rear structure includes a hinge mechanism, a rear door and a wheel cover inner reinforcing plate at the rear floor. The hinge mechanism includes a hinge seat and a rotating arm. The hinge seat is coupled to the wheel cover inner reinforcing plate, the rotating arm is rotatably coupled to the hinge seat, and the rotating arm is coupled to the rear door.

In some embodiments, the hinge mechanism further includes a rotating shaft, and the rotating shaft is rotatably coupled to the hinge seat around an axis extending in the first direction; and the rotating arm includes a sleeve, a rotating arm body and a first fastener. The rotating arm body is coupled to the sleeve, the sleeve is sleeved on the rotating shaft and fixedly coupled to the rotating shaft through the first fastener, and the rotating arm body is coupled to the rear door.

In some embodiments, the rotating arm body includes a mounting plate and a bending arm coupled to each other, the bending arm has a first end coupled to the sleeve and a second end coupled to the mounting plate, and the bending arm bends around the rotating shaft and protrudes towards the wheel cover inner reinforcing plate, and the mounting plate is coupled to the rear door.

In some embodiments, the bending arm includes a first bending sub-arm and a second bending sub-arm detachably coupled to each other, the first bending sub-arm is coupled to the sleeve, and the second bending sub-arm is coupled to the rear door.

In some embodiments, the bending arm further includes a second fastener; the first bending sub-arm includes a first body and a first coupling part coupled to each other, the first body is coupled to the sleeve, and the first coupling part is provided with a first fastening hole; the second bending sub-arm includes a second body and a second coupling part coupled to each other, the second body is coupled to the mounting plate, and the second coupling part is provided with a second fastening hole; and the second fastener penetrates the first fastening hole and the second fastening hole, to couple the first coupling part to the second coupling part.

In some embodiments, the first coupling part is provided with a first step surface and a second step surface intersected with each other, and the second coupling part is provided with a third step surface and a fourth step surface intersected with each other, and the first step surface can abut on the third step surface and the second step surface can abut on the fourth step surface.

In some embodiments, a size of the second bending sub-arm in the first direction is larger than a size of the first bending sub-arm in the first direction.

In some embodiments, the bending arm is constructed as an integrally formed structure, and includes a first bending section and a second bending section coupled to each other. A side of the first bending section far away from the second bending section is coupled to the sleeve, and a side of the second bending section far away from the first bending section is coupled to the mounting plate, and a size of the second bending section in the first direction is larger than a size of the first bending section in the first direction, and a size of the mounting plate in the first direction is larger than the size of the second bending section in the first direction.

In some embodiments, the hinge mechanism further includes a rotating shaft, and the hinge seat includes a first support arm, a second support arm and a coupling beam. The first support arm and the second support arm are oppositely arranged at intervals along the first direction and are coupled through the coupling beam, and the first support arm and the second support arm are coupled to the wheel cover inner reinforcing plate, and the rotating shaft is rotatably coupled between the first support arm and the second support arm around an axis extending in the first direction, and the rotating arm is coupled to the rotating shaft.

In some embodiments, the first support arm includes a first bottom seat, a first support arm plate and a first top seat. The first support arm plate extends along a second direction, the first bottom seat is coupled to a first side of the first support arm plate along the second direction, and the first top seat is coupled to a second side of the first support arm plate along the second direction; the second support arm includes a second bottom seat, a second support arm plate and a second top seat. The second support arm plate extends along a second direction, the second bottom seat is coupled to a first side of the second support arm plate along the second direction, and the second top seat is coupled to a second side of the second support arm plate along the second direction; and the first bottom seat and the second bottom seat are used for coupling the wheel cover inner reinforcing plate, the coupling beam couples the first top seat to the second top seat, and the rotating shaft is rotatably coupled between the first top seat and the second top seat; the second direction and the first direction being interested.

In some embodiments, the hinge seat further includes a stopper, and the stopper is arranged on the first top seat and/or the second top seat and can abut against the rotating arm to limit a rotation angle of the rotating arm.

In some embodiments, the first support arm plate and/or the second support arm plate are provided with a weight-reducing groove; and/or, a first reinforcing structure is coupled between the first support arm plate and the first bottom seat, and/or, a second reinforcing structure is coupled between the second support arm plate and the second bottom seat.

In some embodiments, in a direction away from the first bottom seat along the second direction, a size of the first support arm plate in the third direction gradually decreases, the first direction, the second direction and the third direction being perpendicular to each other; and/or, in a direction away from the second bottom seat along the second direction, a size of the second support arm plate in the third direction gradually decreases, the first direction, the second direction and the third direction being perpendicular to each other.

In some embodiments, the hinge mechanism further includes a rotating shaft, and a single hinge seat, a single rotating shaft and a single rotating arm are provided, and the rotating arm is rotatably coupled to the hinge seat through the rotating shaft, and the rotating shaft is located at a rear side of the rear door.

In some embodiments, only one hinge mechanism supports the rear door.

According to the second aspect of embodiments of the present disclosure, there is also provided an opposing hinged door vehicle, which includes the rear body structure mentioned.

Other embodiments of the present disclosure will easily occur to those skilled in the art after considering the specification and practicing the present disclosure. This application is intended to cover any variations, uses or adaptations of the present disclosure, which follow the general principles of the present disclosure and include common sense or common technical means in this technical field that are not disclosed in the present disclosure. The specification and examples are to be regarded as illustrative only, with the true scope and spirit of the disclosure being indicated by the following claims.

It should be understood that the present disclosure is not limited to the precise structure described above and illustrated in the drawings, and various modifications and changes can be made without departing from its scope. The scope of the present disclosure is limited only by the appended claims.

What is claimed is:

1. A rear structure for a vehicle body, comprising:
a hinge mechanism comprising a hinge seat and a rotating arm;
a rear door; and
a rear wheel cover inner reinforcing plate,
wherein the hinge seat is coupled to the rear wheel cover inner reinforcing plate, the rotating arm is rotatably coupled to the hinge seat, and the rotating arm is coupled to the rear door;
the hinge mechanism further comprises a rotating shaft, the rotating shaft is rotatably coupled to the hinge seat around an axis extending in a first direction;
the rotating arm comprises a sleeve, a rotating arm body and a first fastener, the rotating arm body is coupled to the sleeve, the sleeve is sleeved on the rotating shaft and fixedly coupled to the rotating shaft through the first fastener, and the rotating arm body is coupled to the rear door;
the rotating arm body comprises a mounting plate and a bending arm coupled to each other, the bending arm has a first end coupled to the sleeve and a second end coupled to the mounting plate, the bending arm is bent around the rotating shaft and protruded towards the rear wheel cover inner reinforcing plate, and the mounting plate is coupled to the rear door; and
the bending arm comprises a first bending sub-arm and a second bending sub-arm detachably coupled to each other, the first bending sub-arm is coupled to the sleeve, and the second bending sub-arm is coupled to the rear door.

2. The rear structure according to claim 1, wherein the bending arm further comprises a second fastener;
the first bending sub-arm comprises a first body and a first coupling part coupled to each other, the first body is coupled to the sleeve, and the first coupling part is provided with a first fastening hole;
the second bending sub-arm comprises a second body and a second coupling part coupled to each other, the second body is coupled to the mounting plate, and the second coupling part is provided with a second fastening hole; and
the second fastener penetrates the first fastening hole and the second fastening hole, to couple the first coupling part to the second coupling part.

3. The rear structure according to claim 2, wherein the first coupling part is provided with a first step surface and a second step surface intersected with each other, and the second coupling part is provided with a third step surface and a fourth step surface intersected with each other, and the first step surface is configured to abut on the third step surface and the second step surface is configured to abut on the fourth step surface.

4. The rear structure according to claim 1, wherein a size of the second bending sub-arm in the first direction is larger than a size of the first bending sub-arm in the first direction.

5. The rear structure according to claim 1, wherein a size of the mounting plate in the first direction is larger than a size of the second bending sub-arm in the first direction.

6. The rear structure according to claim 1, wherein the hinge seat comprises a first support arm, a second support arm and a coupling beam; the first support arm and the second support arm are oppositely arranged at intervals along a first direction and are coupled through the coupling beam, and the first support arm and the second support arm are coupled to the rear wheel cover inner reinforcing plate; and the rotating shaft is rotatably coupled between the first support arm and the second support arm around an axis extending in the first direction, and the rotating arm is coupled to the rotating shaft.

7. The rear structure according to claim 6, wherein the first support arm comprises a first bottom seat, a first support arm plate and a first top seat, the first support arm plate extends along a second direction, the first bottom seat is coupled to a first side of the first support arm plate along the second direction, and the first top seat is coupled to a second side of the first support arm plate along the second direction;
the second support arm comprises a second bottom seat, a second support arm plate and a second top seat, the second support arm plate extends along the second direction, the second bottom seat is coupled to a first side of the second support arm plate along the second direction, and the second top seat is coupled to a second side of the second support arm plate along the second direction; and
the first bottom seat and the second bottom seat are configured to couple the rear wheel cover inner reinforcing plate, the coupling beam couples the first top seat to the second top seat, and the rotating shaft is rotatably coupled between the first top seat and the second top seat; the second direction and the first direction are intersected.

8. The rear structure according to claim 7, wherein the hinge seat further comprises a stopper, and the stopper is arranged on at least one of the first top seat or the second top seat and can abut against the rotating arm to limit a rotation angle of the rotating arm.

9. The rear structure according to claim 7, wherein at least one of the first support arm plate or the second support arm plate are provided with a weight-reducing groove.

10. The rear structure according to claim 7, wherein a first reinforcing structure is coupled between the first support arm plate and the first bottom seat.

11. The rear structure according to claim 7, wherein a second reinforcing structure is coupled between the second support arm plate and the second bottom seat.

12. The rear structure according to claim 7, wherein in a direction away from the first bottom seat along the second direction, a size of the first support arm plate in a third direction gradually decreases, the first direction, the second direction and the third direction are perpendicular to each other.

13. The rear structure according to claim 7, wherein in a direction away from the second bottom seat along the second direction, a size of the second support arm plate in the third direction gradually decreases, the first direction, the second direction and the third direction are perpendicular to each other.

14. The rear structure according to claim 1, wherein only one hinge mechanism supports the rear door.

15. An opposing hinged door vehicle, comprising:
a rear structure for a vehicle body, comprising:
    a hinge mechanism comprising a hinge seat and a rotating arm;

a rear door; and
a rear wheel cover inner reinforcing plate,
wherein the hinge seat is coupled to the rear wheel cover inner reinforcing plate, the rotating arm is rotatably coupled to the hinge seat, and the rotating arm is coupled to the rear door;
the hinge mechanism further comprises a rotating shaft, the rotating shaft is rotatably coupled to the hinge seat around an axis extending in a first direction;
the rotating arm comprises a sleeve, a rotating arm body and a first fastener, the rotating arm body is coupled to the sleeve, the sleeve is sleeved on the rotating shaft and fixedly coupled to the rotating shaft through the first fastener, and the rotating arm body is coupled to the rear door;
the rotating arm body comprises a mounting plate and a bending arm coupled to each other, the bending arm has a first end coupled to the sleeve and a second end coupled to the mounting plate, the bending arm is bent around the rotating shaft and protruded towards the rear wheel cover inner reinforcing plate, and the mounting plate is coupled to the rear door; and
the bending arm comprises a first bending sub-arm and a second bending sub-arm detachably coupled to each other, the first bending sub-arm is coupled to the sleeve, and the second bending sub-arm is coupled to the rear door.

\* \* \* \* \*